United States Patent
Tribble et al.

(10) Patent No.: US 10,574,703 B1
(45) Date of Patent: *Feb. 25, 2020

(54) CONTENT DELIVERY EMPLOYING MULTIPLE SECURITY LEVELS

(71) Applicant: AMAZON TECHNOLOGIES, INC., Seattle, WA (US)

(72) Inventors: Alexander Julian Tribble, Seattle, WA (US); Robert Barry, Woodland Hills, CA (US); Jeremy Boynes, Mercer Island, WA (US); Igor Spac, Iasi (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,690

(22) Filed: Mar. 7, 2018

Related U.S. Application Data

(63) Continuation of application No. 14/100,663, filed on Dec. 9, 2013, now Pat. No. 9,935,977.

(51) Int. Cl.
*H04L 29/06* (2006.01)

(52) U.S. Cl.
CPC .......... *H04L 63/20* (2013.01); *H04L 63/0428* (2013.01)

(58) Field of Classification Search
CPC ... H04L 63/20; H04L 63/0428; H04L 63/105; H04L 63/12; H04L 63/168
See application file for complete search history.

(56) References Cited

U.S. PATENT DOCUMENTS

| | | |
|---|---|---|
| 6,772,333 B1 | 8/2004 | Brendel |
| 6,836,795 B2 | 12/2004 | Soderberg et al. |
| 7,010,681 B1 | 3/2006 | Fletcher et al. |
| 8,776,168 B1 | 7/2014 | Gibson et al. |
| 9,118,617 B1 | 8/2015 | Giroux et al. |
| 9,742,778 B2 | 8/2017 | O'Sullivan et al. |
| 2004/0107345 A1 | 6/2004 | Brandt et al. |
| 2005/0010764 A1 | 1/2005 | Collet et al. |
| 2007/0061878 A1 | 3/2007 | Hagiu et al. |
| 2008/0301570 A1 | 12/2008 | Milstead et al. |

(Continued)

OTHER PUBLICATIONS

Lapian, Alexander R., "Non-final Office Action dated May 5, 2015", U.S. Appl. No. 14/100,663, The United States Patent and Trademark Office, dated May 5, 2015.

(Continued)

*Primary Examiner* — Ali S Abyaneh
*Assistant Examiner* — Alexander R Lapian
(74) *Attorney, Agent, or Firm* — Lindauer Law, PLLC

(57) ABSTRACT

Techniques are described for delivering one or more first resources of a page using a first security level, and delivering one or more second resources of a page using a second, different security level. A page is generated to include elements identifying resources to be presented in the page, and the elements may include security level identifiers indicating a security level to be employed in communicating the corresponding resource. Each security level may be associated with a set of security measures that ensure the integrity or confidentiality of the resource while it is communicated. The use of multiple security levels to communicate multiple resources may provide appropriate security for each resource, reducing latency and overhead in page generation, communication, and rendering.

20 Claims, 11 Drawing Sheets

(56) References Cited

U.S. PATENT DOCUMENTS

| | | |
|---|---|---|
| 2012/0170746 A1 | 7/2012 | Chen et al. |
| 2012/0198241 A1 | 8/2012 | O'Hare et al. |
| 2013/0091350 A1* | 4/2013 | Gluck .............. H04L 63/0281 |
| | | 713/153 |
| 2013/0254831 A1 | 9/2013 | Roach et al. |
| 2014/0020070 A1 | 1/2014 | Angal |
| 2014/0059649 A1 | 2/2014 | Hu et al. |
| 2014/0101443 A1 | 4/2014 | Park et al. |
| 2014/0115029 A1 | 4/2014 | Baldwin et al. |

OTHER PUBLICATIONS

Lapian, Alexander R., "Final Office Action dated Oct. 23, 2015", U.S. Appl. No. 14/100,663, The United States Patent and Trademark Office, dated Oct. 23, 2015.

Lapian, Alexander R., "Advisory Action dated Jan. 29, 2016", U.S. Appl. No. 14/100,663, The United States Patent and Trademark Office, dated Jan. 29, 2016.

Lapian, Alexander R., "Non-final Office Action dated Jun. 24, 2016", U.S. Appl. No. 14/100,663, The United States Patent and Trademark Office, dated Jun. 24, 2016.

Lapian, Alexander R., "Final Office Action dated Dec. 21, 2016", U.S. Appl. No. 14/100,663, The United States Patent and Trademark Office, dated Dec. 21, 2016.

Lapian, Alexander R., "Advisory Action dated Feb. 28, 2017", U.S. Appl. No. 14/100,663, The United States Patent and Trademark Office, dated Feb. 28, 2017.

Lapian, Alexander R., "Non-final Office Action dated Jun. 27, 2017", U.S. Appl. No. 14/100,663, The United States Patent and Trademark Office, dated Jun. 27, 2017.

Lapian, Alexander R., "Notice of Allowance dated Nov. 30, 2017", U.S. Appl. No. 14/100,663, The United States Patent and Trademark Office, dated Nov. 30, 2017.

* cited by examiner

CONTENT DELIVERY EMPLOYING MULTIPLE SECURITY LEVELS

PRIORITY

This application is a continuation of, and claims priority to, U.S. patent application Ser. No. 14/100,663 filed on Dec. 9, 2013, now issued as U.S. Pat. No. 9,935,977, entitled "Content Delivery Employing Multiple Security Levels". The entirety of this previously filed application is hereby incorporated by reference.

BACKGROUND

To ensure a positive user experience for users of a web site, developers may design the web site such that its web pages are more likely to be efficiently or quickly rendered in a web browser. In many cases, the contents of a web page may include confidential, personal, or otherwise sensitive data that is to be delivered in an encrypted form or using other types of security measures. However, providing secure delivery of the sensitive data may introduce latency into the delivery or rendering of the data for a web page, potentially degrading the user experience of users browsing the web page.

Figure 1:
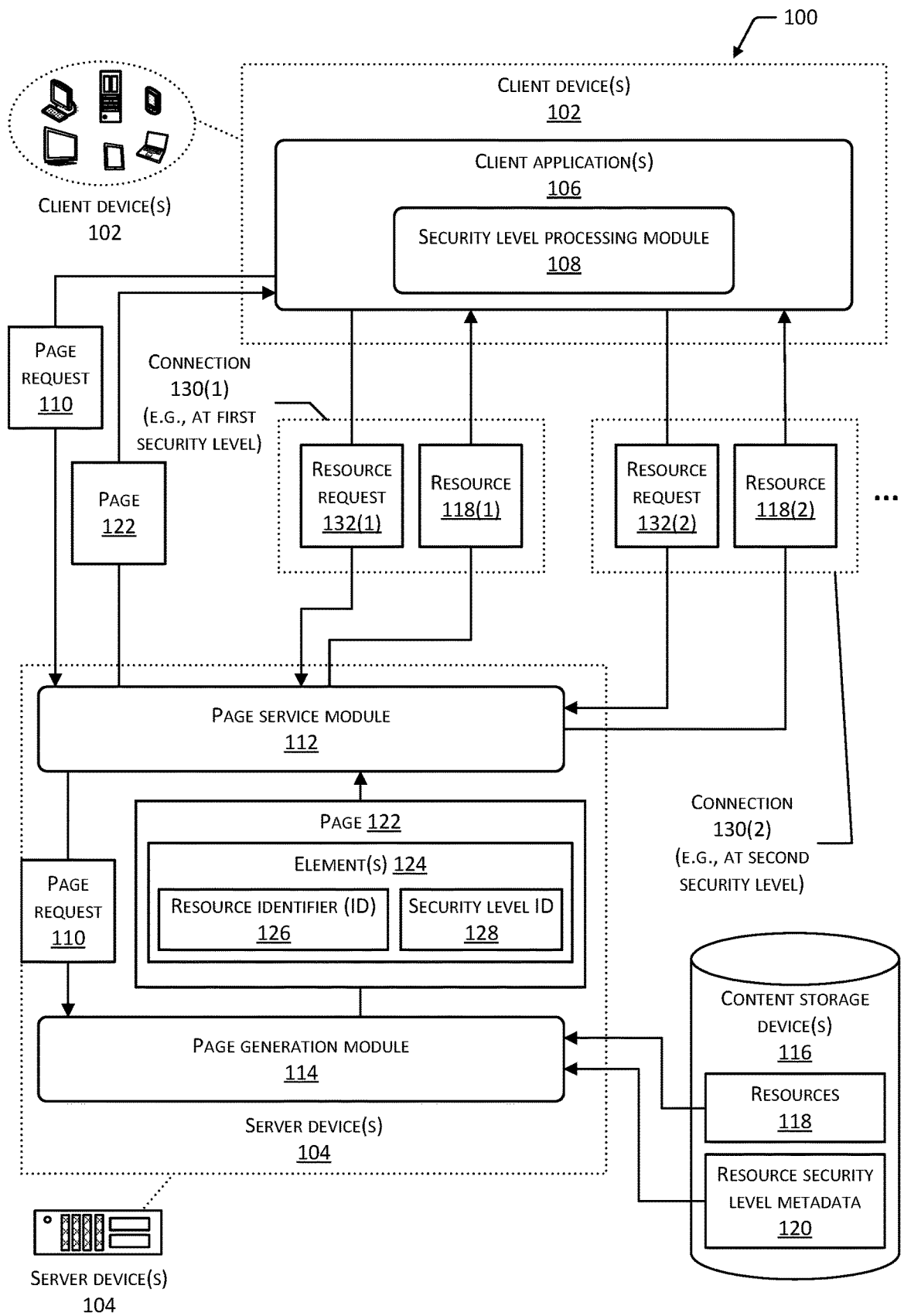
FIG. 1 depicts an environment including a server device for serving a page of content to a client device, the page including at least two resources that are communicated to the client device using different security levels.

Certain implementations and embodiments will now be described more fully below with reference to the accompanying figures, in which various aspects are shown. However, various aspects may be implemented in many different forms and should not be construed as limited to the implementations set forth herein. Like reference numbers refer to like elements throughout.

DETAILED DESCRIPTION

This disclosure describes implementations of systems, devices, methods, and computer-readable media for serving pages of content for presentation on a client device, at least some of the pages including at least two resources that are communicated at different security levels. In some implementations, one or more resources in a page may each be associated with a security level, and the security level may correspond to a set of one or more security measures to be employed to communicate the associated resource over a network. Security measures may include cryptographic measures that encrypt the resource to ensure its confidentiality during communication. For example, security measures may include encryption according to any version of the Advanced Encryption Standard (AES) or the Rivest Cipher (RC), such as RC4, RC5, RC6, or any other encryption technique or algorithm, using any encryption block size or any encryption key size. Security measures may also include the use of a message authentication code (MAC) to ensure the integrity of the resource during communication, e.g., to ensure that the resource that was sent is identical to or substantially the same as the resource that is received. For example, security measures may include the use of a keyed-hash MAC (HMAC) including but not limited to HMAC using a version of the Secure Hash Algorithm (SHA), such as HMAC-SHA0, HMAC-SHA1, HMAC-SHA2, or HMAC-SHA3; or HMAC using a version of the message digest (MD) algorithm, such as HMAC-MD4 or HMAC-MD5. A security level may correspond to any number of security measures to be employed in communicating a resource.

In many cases, a page of content (e.g., a web page) may include different types of content or different classes of data. For example, a web page that is part of an electronic commerce web site or online store may include content that is publicly available and therefore non-sensitive and non-confidential, such as publicly available product data. The web page may also include more sensitive, personal, or private data that is confidential. Such confidential information may include user identification information, address data, contact information, payment data, and other types of data that may be presented to a user after the user has logged into or otherwise been authenticated to the web site. In some cases, developers may design a page such that resources within the page are communicated using security measures that are appropriate for the confidential information in the page. Such measures may ensure that the confidential information is secure during communication, but may be excessive for communicating the other, non-confidential information in the page. The use of excessive security measures for communicating non-confidential information may consume developer time and computing resources, and may introduce latency in communicating and rendering pages of content.

This disclosure describes implementations in which two or more resources in a page are communicated at two different security levels that are each associated with a set of security measures. For example, confidential information in a page may be communicated using a first encryption method to ensure the confidentiality of the information, and the non-confidential information in a page may be communicated using a second encryption method that provides weaker encryption than the first encryption method. Alternatively, the non-confidential information may be communicated substantially in the clear, as plaintext or otherwise unencrypted information. As another example, confidential information may be communicated using an encryption method to ensure its confidentiality, and non-confidential information may be communicated using a MAC or other technique that ensures the integrity of the data but not its confidentiality. By specifying the security level for one or more individual resources in a page, implementations may enable each of the resources of a page to be communicated using a level of security that is appropriate for the resource. Accordingly, implementations may reduce overhead and costs in development time, computing resources, and may reduce the latency of page delivery and rendering.

FIG. 1 depicts an environment 100 for delivering one or more content pages, such as web pages. As shown in FIG. 1, the environment 100 may include one or more client devices 102. The client device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the client devices 102 may comprise a cluster, cloud, farm, or other grouping of multiple devices that coordinate operations to provide load balancing, failover support, parallel processing capabilities, shared storage resources, or other aspects. In some cases, the client device(s) 102 may include substantially mobile devices such as user devices. The client device(s) 102 are described further with reference to FIG. 6.

The environment 100 may also include one or more server devices 104 in communication with the client device(s) 102. The server device(s) 104 may comprise any type of computing device, including but not limited to any of the types of computing devices described with reference to the client device(s) 102. In some cases, two or more of the server devices 104 may comprise a cluster, cloud, farm, or other grouping of multiple devices that coordinate operations to provide load balancing, failover support, parallel processing capabilities, shared storage resources, or other aspects. The server device(s) 104 are described further with reference to FIG. 7. Although devices may be described herein as either client device(s) 102 or server device(s) 104, such descriptions are not limiting of implementations. In some cases, the client device(s) 102 may provide at least some functionality described with reference to the server device(s) 104, and the server device(s) 104 may provide at least some functionality described with reference to the client device(s) 102. Accordingly, the computing devices described herein may exhibit characteristics of the client device(s) 102, the server device(s) 104, or both client device(s) 102 and server device(s) 104.

The client device(s) 102 may execute one or more client application(s) 106 that are configured to present pages of content. For example, the client application(s) 106 may include a web browser configured to present one or more web pages for one or more web sites. Implementations support the use of any web browser, including but not limited to one or more of the following: Mozilla Firefox; Microsoft Internet Explorer; Google Chrome; Apple Safari; Rockmelt; and so forth. Implementations also support the use of a web browser in which the processing of web content is performed partly on the server device 104 and partly on the client device 102, such as the Amazon Silk browser. In such cases, one or more web browser subsystems may execute on the client device 102, and one or more web browser subsystems may execute on the server device 104. Although the examples herein describe presenting web pages within a web browser executing on the client device(s) 102, implementations are not so limited. Implementations support the presentation of pages of content on the client device(s) 102, in any type of the client application(s) 106. Accordingly, the client application(s) 106 may be arranged to present one or more particular types of content included in a page, or may be arranged to present a broad range of different types of content.

In some implementations, the client application(s) 106 may include a security level processing module 108 that is configured to analyze one or more pages to determine security levels associated with resources in each page. The security level processing module 108 may also be configured to negotiate or otherwise establish a connection with the server device(s) 104, the connection to be employed to communicate one or more resources at a security level specified in the page. Although FIG. 1 depicts the security level processing module 108 as a sub-module, sub-component, or sub-process of the client application(s) 106, in some cases the security level processing module 108 may execute as a separate module, component, or process relative to the client application(s) 106.

The client application(s) 106 may enable one or more users of the client device(s) 102 to generate a page request 110 that is sent to the server device(s) 104. The page request 110 may identify and request one or more pages of content to be communicated to the client device(s) 102 and presented within the client application(s) 106. In cases where the client application(s) 106 include a web browser, the page request 110 may be in the form of a Hypertext Transfer Protocol (HTTP) request. In such cases, the page request 110 may include one or more Uniform Resource Identifiers (URIs), such as Uniform Resource Locators (URLs) or Uniform Resource Names (URNs), or other identifiers that identify the requested page(s). In some cases, the page request 110 may be sent and the requested page may be received over a secured connection to the server device(s) 104, the secured connection employing a security protocol such as any version of the Secure Socket Layer (SSL) or the Transport Layer Security (TLS) protocol.

The page request 110 may be received by a page service module 112 executing on the server device(s) 104. The page service module 112 may provide the page request 110 to a page generation module 114 executing on the server device(s) 104. In some cases, the page service module 112 may perform initial processing of the page request 110 to determine whether the requested page exists or is valid, before providing the page request 110 to the page generation module 114. The page generation module 114 may analyze the page request 110 and determine the requested page based on the identification of the page (e.g., the URI) included in the page request 110.

The page generation module 114 may communicate with one or more content storage device(s) 116 that store information (e.g., content) to be presented within one or more pages. The content storage device(s) 116 may comprise any type of data storage system or datastore, and may be a relational or a non-relational datastore. Implementations support any type or format of data storage for the content storage device(s) 116, including but not limited to a database, an array, a structured list, a tree, a key-value storage, flat files, unstructured data, or any other data structure or format. Although the content storage device(s) 116 are depicted as external to the client device(s) 102 and the server device(s) 104, in some implementations the content storage device(s) 116 may be at least partly incorporated into the client device(s) 102, the server device(s) 104, or both the client device(s) 102 and the server device(s) 104.

The content storage device(s) 116 may store a plurality of resources 118 to be presented within one or more pages. Implementations support any type of the resources 118, including any type of data in any format and of any size. The resources 118 may include, but are not limited to, one or more of the following:

Substantially static content files including data and metadata described using any version of Hypertext Markup Language (HTML), Dynamic HTML (DHTML), Extensible HTML (XHTML), Extensible Markup Language (XML), or other types of character data encoded using American Standard Code for Information Exchange (ASCII), Unicode, or any other format, in a compressed or uncompressed form;

Script files that provide dynamic content using any scripting or programming language, including any version of JavaScript, VBScript, Perl, Common Gateway Interface (CGI), Cascading Style Sheets (CSS), other types of style sheets, and so forth;

Image files in any compressed or uncompressed format, such as a version of the Joint Photographic Experts Group (JPEG) format, the Graphics Interchange Format (GIF), the Bitmap (BMP) image file format, and so forth; or Audio, video, or multimedia content files in any compressed or uncompressed format, such as a version of the Waveform Audio File Format (WAV), the AU file format, the Moving Picture Experts Group (MPEG) formats such as MPEG-1, MPEG-2, MP3, or MPEG-4 formats, the Audio Video Interleave (AVI) format, and so forth.

For a page specified in the page request 110, the page generation module 114 may determine one or more of the resources 118 to be presented within the page. In some cases, this determination may be based on the page's Document Object Model (DOM) that is stored in the content storage device(s) 116. For each of the resources 118 to be presented within the requested page, the page generation module 114 may also determine a security level associated with the resource 118. The determination of the security level may be based on resource security level metadata 120 that is stored in the content storage device(s) 116. The security level for a resource 118 may be associated with a set of one or more security measures to be employed to communicate the resource 118 to the client device(s) 102. The resource security level metadata 120, and the security measures associated with various security levels, are described further with reference to FIG. 4.

The page generation module 114 may generate source code for a page 122 specified in the page request 110. In cases where the page 122 is a web page, the source code may be specified using any version of HTML, DHTML, XHTML, and so forth. The page generation module 114 may generate the page 122 to include one or more elements 124, where each of the elements 124 includes a resource identifier (ID) 126 that identifies one of the resources 118. For example, in cases where the page 122 is a web page, the resource ID 126 may be a URI of the resource 118 included in a HTML tag such as a script tag, an image tag, and so forth. At least one of the elements 124 may also include a security level ID 128 identifying a security level corresponding to the resource 118. In some implementations, the security level ID 128 may be specified in a HTML attribute in a HTML tag. Alternatively, the security level ID 128 may be specified in a parameter (e.g., query parameter) included in the URI of the resource 118. In some cases, the security level ID 128 may be specified as a particular communication protocol within the URI of the resource 118. In some cases, each of the elements 124 may include both the resource ID 126 and the security level ID 128. Alternatively, at least some of the elements 124 may omit the security level ID 128. Such an omission may instruct the client device 102 to employ a default security level for communicating the resource 118, or to employ whatever security measures were negotiated to establish the connection to communicate the page request 110. Examples of the elements 124 are described further with reference to FIG. 5.

The inclusion of the security level ID 128 in the element(s) 124 may constitute a suggestion, by the page generation module 114 to the client application(s) 106, that a particular security level be employed when communicating the resource 118. The security level processing module 108 or the client application(s) 106 may respond to the suggestion by modifying a list of security measures communicating in one or more handshake messages used to establish the connection used to communicate the resource 118. Such modifications are described further with reference to FIG. 11.

Figure 8:
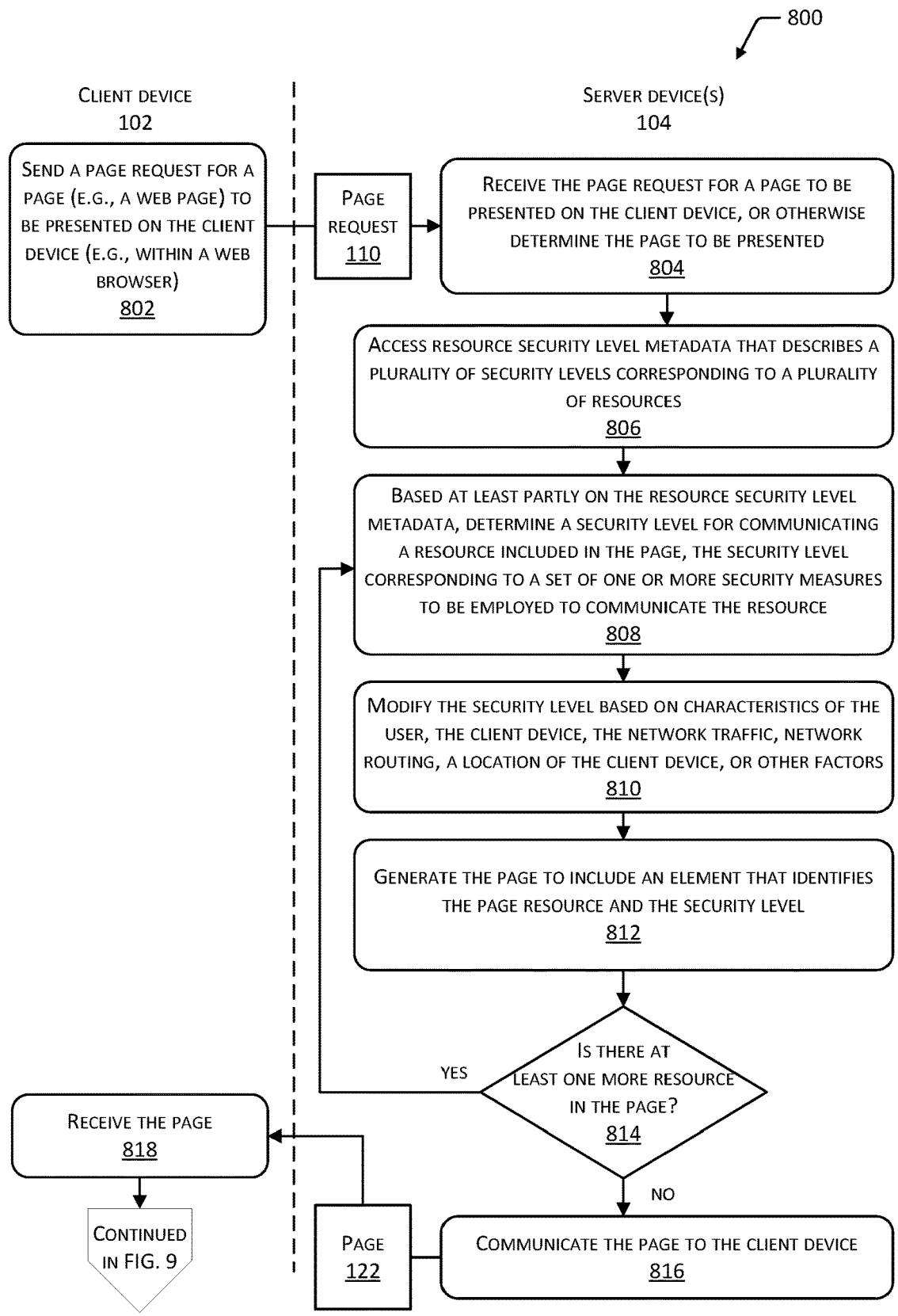
FIG. 8 depicts a flow diagram of a process for generating a page to include one or more page elements, each page element identifying a resource and a security level for communicating the resource.

The generation of the page 122 by the page generation module 114, or by some other module, is described further with reference to FIG. 8. Implementations support the generation of the page 122 to include static content, dynamic content, or both static and dynamic content. Static content of the page 122 may include content that is substantially the same or similar across multiple renderings and presentations of the page 122. Such static content may be generated by retrieving static content from the content storage device(s) 116 or from other storage. Dynamic content of the page 122 may include content that is generated in response to the page request 110. Dynamic content may be based on particular characteristics of the client device 102 that sent the page request 110, or on the identity or particular characteristics of a user that generated the page request 110 using the client application(s) 106. Accordingly, dynamic content may change in some aspects across multiple renderings and presentations of the page 122.

The page 122, including one or more elements 124, may be provided by the page generation module 114 to the page service module 112. The page service module 112 may then communicate the page 122 to the client application(s) 106 on the client device(s) 102 as a response to the page request 110. The client application(s) 106, or the security level processing module 108, may parse or otherwise analyze the page 122, and determine a security level corresponding to each of the resources 118 identified in the element(s) 124 included in the page 122. For one or more element(s) 124 that include a suggested security level according to the security level ID 128, the client application(s) 106 or the security level processing module 108 may negotiate a connection 130 over which to send a resource request 132 requesting the resource 118 identified in the element 124. In some cases the connection 130 may be established using one or more security measures corresponding to the suggested security level for the resource 118. In this way, the security measures employed to communicate each of the resources 118 may be tailored or otherwise specified to be appropriate for the particular resource 118. The client application 106 or the security level processing module 108 may negotiate any number of the connections 130 with the server device 104 to be employed for communicating the resource(s) 118. Over one of the connections 130, the client device(s) 102 may send the resource request 132. The connections 130 may be employed in serial or in parallel to communicate the resources 118 to the client device(s) 102. In some cases, connection pooling may be employed to reuse a connection 130 that was previously established according to an appropriate security level.

On receiving the resource request 132, the page service module 112 (or some other module of the server device(s) 104) may retrieve the requested resource 118 and communicate it to the client device(s) 102 using the connection 130. In some cases, the server device 104 that serves the resource 118 may be different than the server device 104 that received the initial page request 110 and served the page 122. Distributed content service environments may employ any number of server device(s) 104 as content servers, and such server device(s) 104 may be physically co-located or remote from one another. On receiving each of the resource(s) 118, the client application(s) 106 may load or otherwise present the resource(s) 118. The processing of the page 122 on the client device(s) 102 is described further with reference to FIG. 9. The negotiation of the connection 130 between the server device(s) 104 and the client device(s) 102 is described further with reference to FIG. 11.

The server device(s) 104 depicted in FIG. 1 may perform any number of roles within the larger content serving environment 100. In some cases, the server device(s) 104 may include backend server devices or content server devices that generate the page(s) 122 to be served to the client device(s) 102. The server device(s) 104 may also include intermediate server devices or edge server devices that receive the page request(s) 110, process them, and send them on to one or more content servers or backend servers. Moreover, in some cases, the server device(s) 104 may include content cache servers that are physically located in proximity to the client device(s) 102, such as in a user's home or office, and operate to provide cached or otherwise stored content. Accordingly, in some cases, the server device 104 that executes the page service module 112 to receive the page request 110 and serve the page 122 and its resources 118 may be a different server than the server device 104 that executes the page generation module 114 to generate the dynamic or static content of the page 122. Moreover, in some cases the client device(s) 102 may include one or more intermediary devices that may pre-process, analyze, or cache content before sending it to be presented in the client application 106 executing on another client device 102.

Although the examples herein may describe the page 122 as a web page to be presented in a web browser, and may describe the resources 118 as web page resources that may be rendered in a web browser, implementations are not so limited. Implementations support the inclusion of any type or format of content, information, or data in the page 122 and the resources 118. Implementations support a page 122 which includes any number of items that may be arranged as branch and leaf nodes in a graph, such that the items may exhibit a hierarchical relationship with one another and such that one item may refer to another item. For example, in some implementations the page 122 may be an executable program that includes or refers to multiple program sections. A first section, such as a cryptographic key included in the program, may be communicated using a first security level. A second section that is less sensitive or confidential may be communicated using a second security level that provides a lower level of security than the first security level. Implementations support the communication of any information that includes multiple sections that are to be communicated at different security levels.

Figure 2:
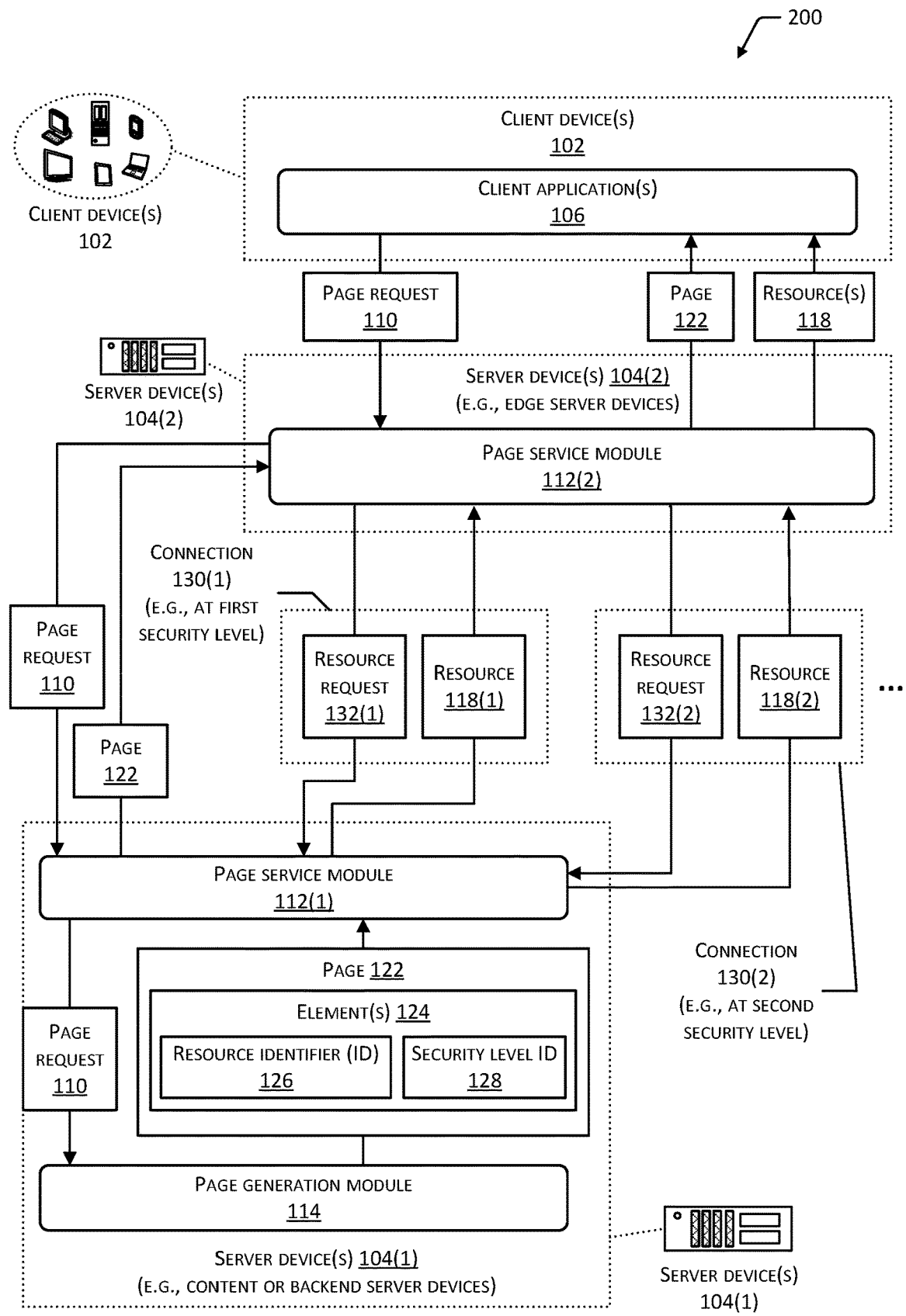
FIG. 2 depicts an environment including a content server device and an edge server device for serving a page of content to a client device, the page including at least two resources that are communicated between the content server device and the edge server device using different security levels.

FIG. 2 depicts an environment 200 including one or more server device(s) 104(1) and one or more server device(s) 104(2). In the example of FIG. 2, the server device(s) 104(1) may function as backend or content servers that generate dynamic or static content of the page 122, and the server device(s) 104(2) may function as intermediate, proxy, or edge servers that deliver the page 122 and its included resource(s) 118 to the client device(s) 102. The elements shown in FIG. 2 may function similarly to the like-numbered elements depicted in FIG. 1.

In implementations illustrated by FIG. 2, the page request 110 may be generated by the client application(s) 106 (e.g., a web browser) executing on the client device(s) 102. The page request 110 may be sent to the server device(s) 104(2), which may include edge server devices, gateway server devices, load balancing devices, front end server devices, or any other type of server device that acts as an intermediary between the client device(s) 102 and the server device(s) 104(1) (e.g., the backend or content server devices). The server device(s) 104(1) and 104(2) may be physically separate devices. Alternatively, the server device(s) 104(1) and 104(2) may be logically separate server environments running on a same set of one or more computing devices. In some cases, the server device(s) 104(2) may operate as a proxy server to perform server-side content retrieval, caching, and processing. For example, the server device(s) 104(2) may be proxy servers that support the operation of client application(s) 106 such as the Silk web browser provided by Amazon, Inc. of Seattle, Wash., USA.

The server device(s) 104(2) may execute a page service module 112(2), which may receive the page request 110 and send it to the page service module 112(1) executing on the server device(s) 104(1). As described with reference to FIG. 1, the page service module 112(1) may send the page request 110 to the page generation module 114, which performs operations to generate source code for the page 122 in response to the page request 110. Although not depicted in FIG. 2, the page generation module 114 may interact with the content storage device(s) 116 to retrieve the resource 118 and the resource security level metadata 120 as described above. The page generation module 114 may generate the page 122 to include one or more elements 124, each element 124 including the resource ID 126 and the security level ID 128 as described herein. The page 122 may then be sent to the page service module 112(2) executing on the server device(s) 104(2).

On receiving the page 122, the page service module 112(2) may analyze the element(s) 124 in the page 122, and determine one or more resources 118 to request using any number of security levels. As shown in FIG. 2, the page service module 112(2) may negotiate any number of connections 130 with the page service module 112(1), each connection 130 employing a security level that is appropriate for communicating one or more resources 118 as described above. The resource(s) 118 may be sent to the page service module 112(2) using the one or more connections 130. The page service module 112(2) may then provide the page 122 and the resource(s) 118 to the client application(s) 106, for presentation to a user of the client device(s) 102. FIG. 2 illustrates implementations in which a plurality of connections 130 are established between the server device(s) 104(1) and the server device(s) 104(2), the plurality of connections 130 employing any number of security levels indicated by the security level ID(s) 128. The connection(s) 130 may then be employed to communicate the resource(s) 118 from the server device(s) 104(1) to the server device(s) 104(2). Accordingly, in implementations illustrated by FIG. 2, the server device(s) 104(2) may at least partly play the role played by the client device(s) 102 in implementations illustrated by FIG. 1, with respect to the communication of the resources 118.

Figure 3:
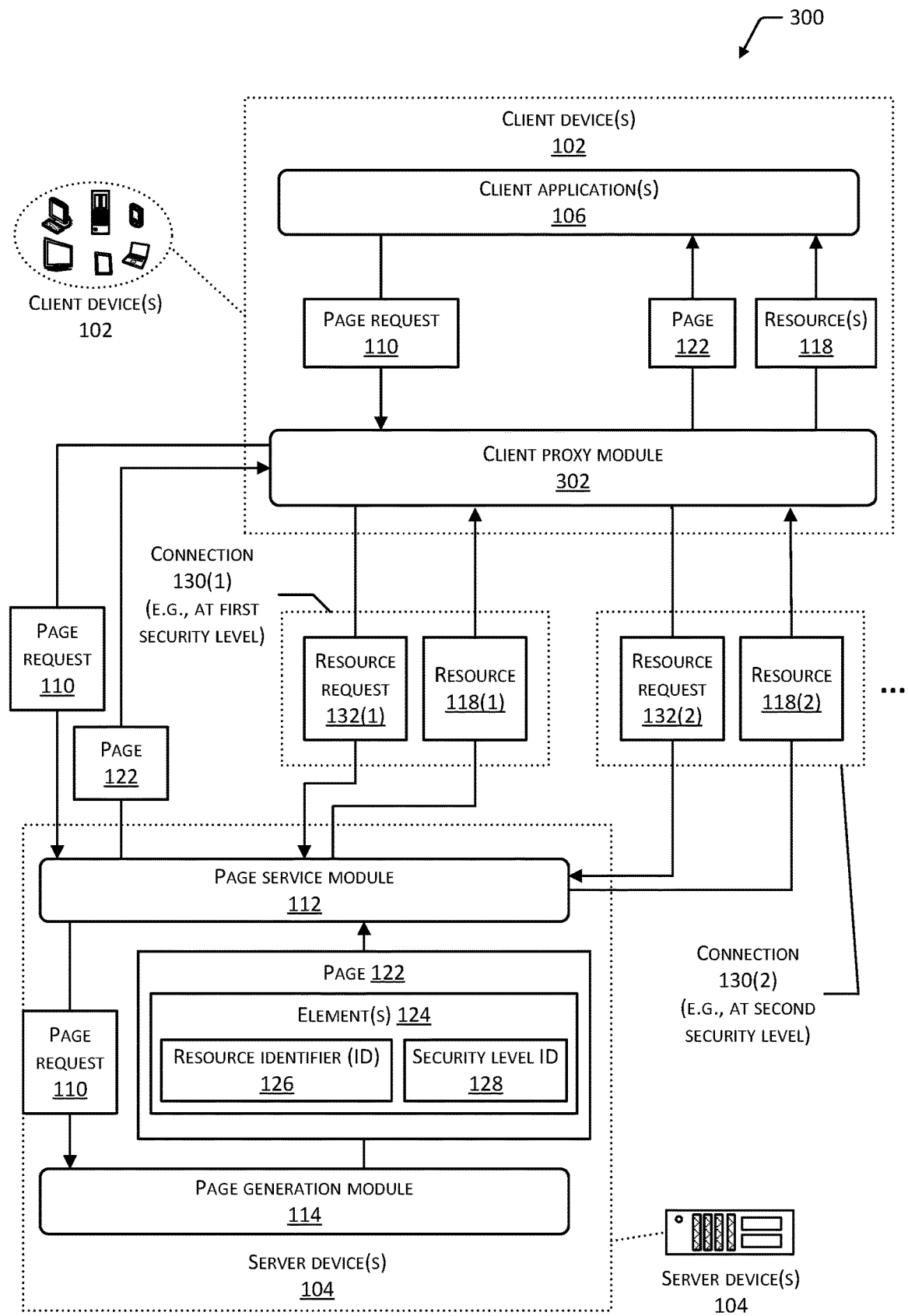
FIG. 3 depicts an environment including a server device for serving a page of content to a client device that includes a client proxy module, the page including at least two resources that are communicated to the client proxy module using different security levels.

FIG. 3 depicts an environment 300 including the server device(s) 104 that serve content to the client device(s) 102 that includes a client proxy module 302. In implementations illustrated by FIG. 3, the client proxy module 302 may operate as an intermediary between the client application(s) 106 and the server device(s) 104. Although the client proxy module 302 is depicted in FIG. 3 as executing on the client device(s) 102, implementations are not so limited. In some cases, the client proxy module 302 may execute on a separate device that is in communication with the client device(s) 102 and the server device(s) 104. For example, the client proxy module 302 may be executing on one or more proxy servers that are in the client environment (e.g., located in proximity to the client device(s) 102). In some implementations, the client proxy module 302 may be configured to retrieve, analyze, and store content to be presented within the client application(s) 106.

In implementations illustrated by FIG. 3, the page request 110 may be generated by the client application(s) 106 (e.g., a web browser) executing on the client device(s) 102. The page request 110 may be sent to the client proxy module 302, which may send the page request 110 on to the page service module 112 executing on the server device(s) 104. As described with reference to FIG. 1, the page service module 112 may send the page request 110 to the page generation module 114, which performs operations to generate source code for the page 122 in response to the page request 110. Although not depicted in FIG. 3, the page generation module 114 may interact with the content storage device(s) 116 to retrieve the resource 118 and the resource security level metadata 120 as described above. The page generation module 114 may generate the page 122 to include one or more elements 124, each element 124 including the resource ID 126 and the security level ID 128 as described herein. The page 122 may then be sent to the client proxy module 302.

On receiving the page 122, the client proxy module 302 may analyze the element(s) 124 in the page 122, and determine one or more resources 118 to request using any number of security levels. As shown in FIG. 3, the client proxy module 302 may negotiate any number of connections 130 with the page service module 112, each connection 130 employing a security level that is appropriate for communicating one or more resources 118 as described above. The resource(s) 118 may be sent to the client proxy module 302 using the one or more connections 130. The client proxy module 302 may then provide the page 122 and the resource(s) 118 to the client application(s) 106, for presentation to a user of the client device(s) 102. FIG. 3 illustrates implementations in which a plurality of connections 130 are established between the server device(s) 104 and the client proxy module 302, the plurality of connections 130 employing any number of security levels indicated by the security level ID(s) 128. The connection(s) 130 may then be employed to communicate the resource(s) 118 from the server device(s) 104 to the client proxy module 302. Accordingly, in implementations illustrated by FIG. 3, the client proxy module 302 may at least partly play the role played by the client application(s) 106 in implementations illustrated by FIG. 1, with respect to the communication of the resources 118.

Implementations may employ any of the system configurations described in the environments 100, 200, and 300, individually or in any combination. For example, in some cases, the environment in which implementations operate may include the server device(s) 104(1) and 104(2) as shown in FIG. 2 (e.g., separate content/backend servers and edge/intermediate servers) as well as the client proxy module 302 as shown in FIG. 3. Accordingly, one or both of the server-side and client-side devices may include an additional intermediary or proxy device that participates in the connection(s) 130 to communicate the resource(s) 118 using different security levels.

The various devices of the environments 100, 200, and 300 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100, 200, and 300 may be encrypted or otherwise secured. For example, such communications may employ one or more public or private cryptographic keys, digital certificates, or other credentials supported by a security protocol such as any version of the SSL or the TLS protocol. Moreover, in some implementations communications between two or more of the devices in the environment 100 may employ a multichannel, multiplexed communication protocol such as SPDY provided by Google, Inc.

Figure 4:
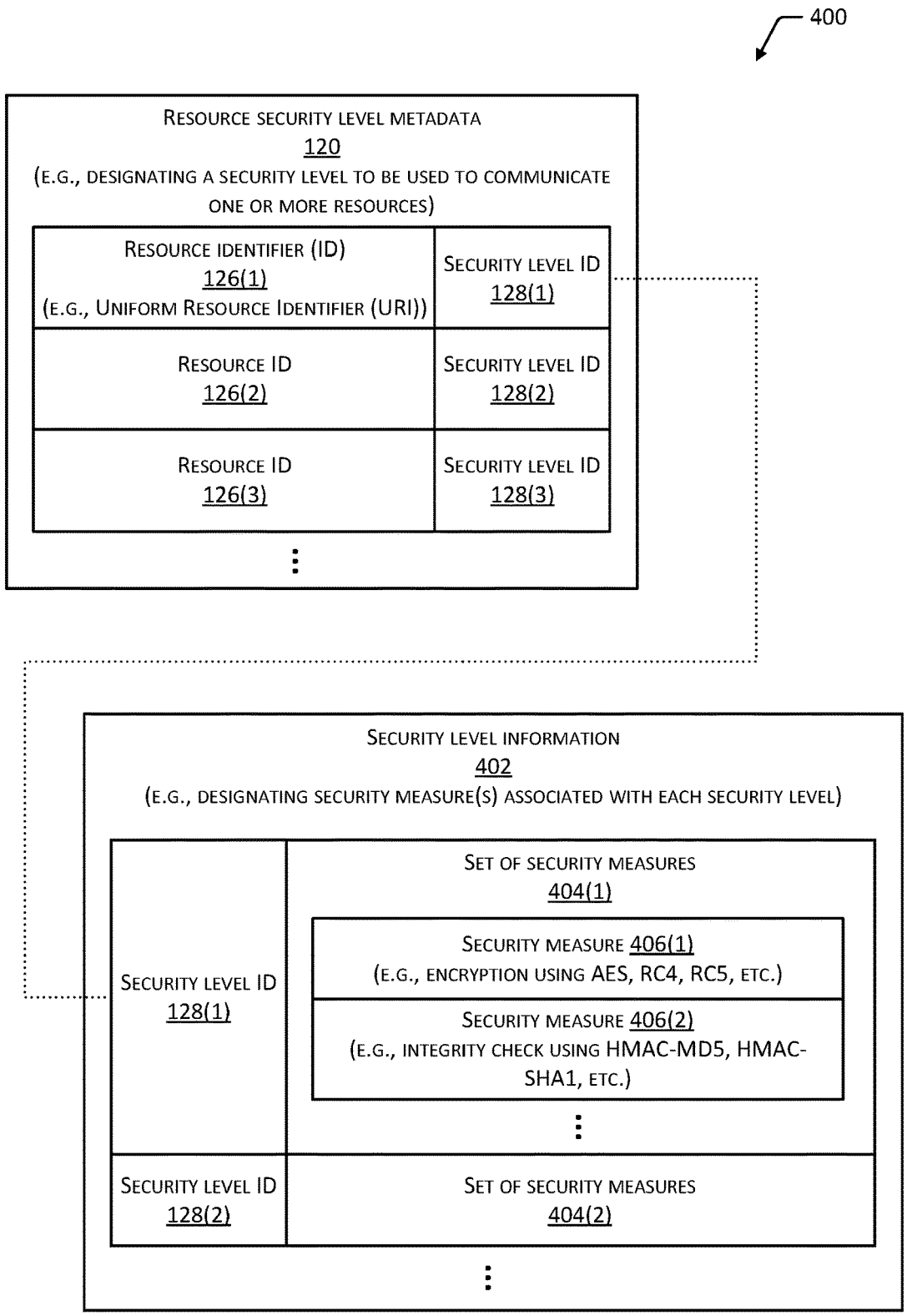
FIG. 4 depicts a schematic of example resource security level metadata that associates a security level with each of one or more page resources, and a schematic of example security level information that associates a security level with a set of one or more security measures to be employed in communicating a resource at that security level.

FIG. 4 depicts a schematic 400 of an example of the resource security level metadata 120. In some implementations, one or more resources 118 stored on the content storage device(s) 116 may be stored with the security level ID 128, such as an attribute or tag that specifies a security level for the resource 118. In such cases, the resource security level metadata 120 may be incorporated into one or more tables or other data storage structures that store the resources 118. Alternatively, the resource security level metadata 120 may be stored as a separate table, list, or other data structure that associates a security level with one or more of the resources 118. As shown in the example of FIG. 4, the resource security level metadata 120 may identify one or more of the resources 118 using a resource ID 126, such as a URI providing a location of the resource 118. The resource security level metadata 120 may, for one or more of the resource IDs 126, indicate a security level ID 128 corresponding to a security level for the resource 118.

In some implementations, one or both of the client device(s) 102 and the server device(s) 104 may store, or have access to, security level information 402. The security level information 402 associates each of one or more security levels to a set of one or more security measures 404 to be employed in communicating a resource 118 at that security level. As described above, the set of security measures 404 for a security level may include any number of security measures 406 designed to provide confidentiality, integrity, or both confidentiality and integrity of the resources 118 communicated between the server device(s) 104 and the client device(s) 102, or between different server devices 104. The security level information 402 may designate, for each of one or more security level IDs 128, a set of one or more security measures 404 to be employed when communicating a resource 118 that has been assigned that security level ID 128 in an element 124 of the page 122.

The security level IDs 128 may be in any format, including but not limited to text format, binary format, and so forth. In some cases, the security level IDs 128 may be descriptive in some way. For example, a security level ID 128 specifying a security level that provides integrity but not confidentiality (e.g., that employs security measures such as a MAC but not stronger encryption) may be described using the security level ID 128 "integrity." Alternatively, the security level IDs 128 may be encoded to be somewhat more obscure and not readily understandable by an observer without access to the resource security level metadata 120 or the security level information 402. For example, the security level ID 128 for the example above may be "13."

Figure 5:
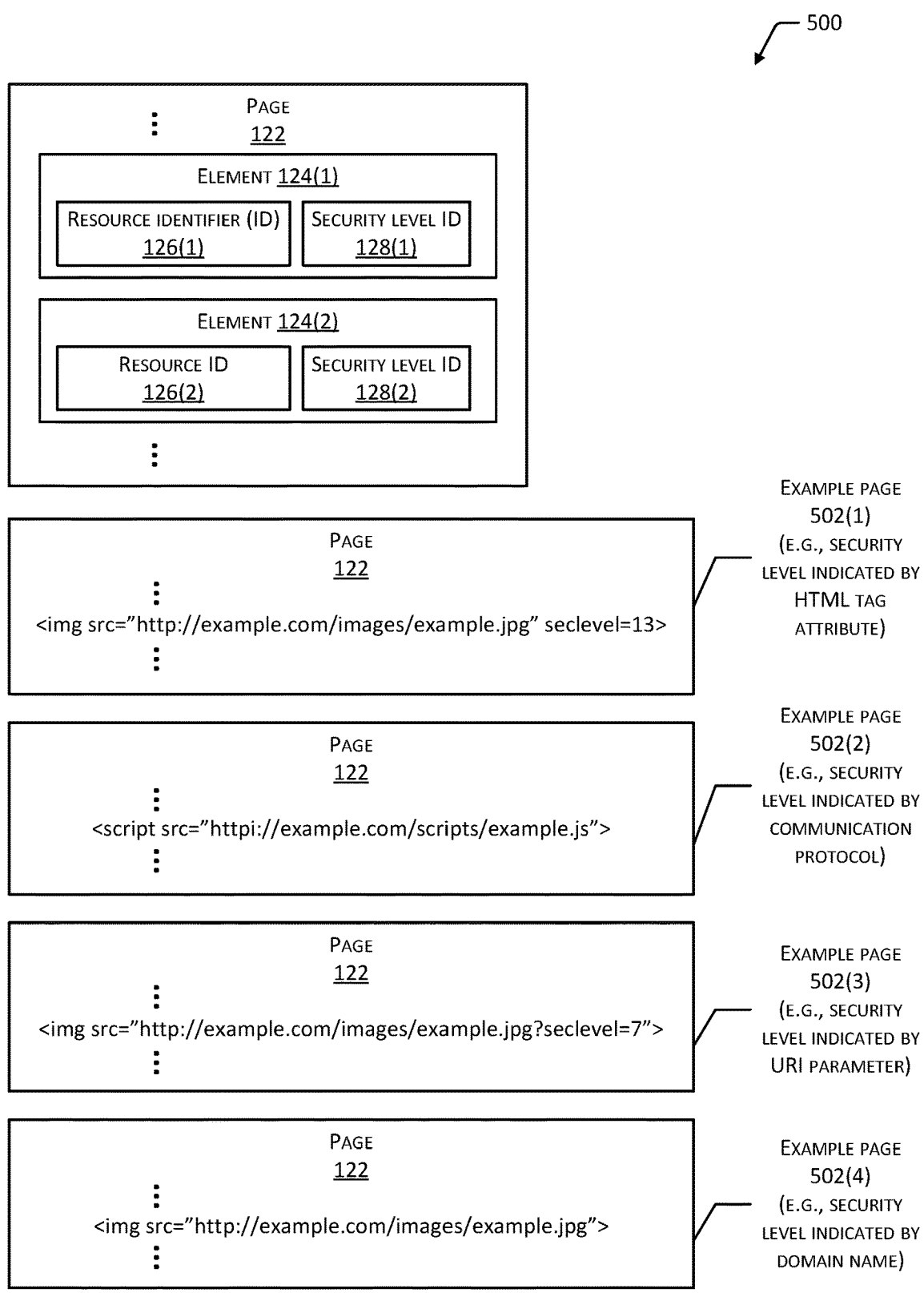
FIG. 5 depicts a schematic of an example page that includes one or more page elements, each page element identifying a resource and a security level to be employed in communicating that resource.

FIG. 5 depicts a schematic 500 showing various non-limiting examples of the page 122 including one or more elements 124. As shown in the schematic 500, each element 124 may identify the resource 118 using the resource ID 126. One or more of the elements 124 may also specify a security level for the resource 118 using the security level ID 128. As described above, the security level ID 128 may identify a security level that is associated with a set of security measures 404 to be employed to communicate the resource 118 identified by the resource ID 126.

The schematic 500 includes example pages 502 illustrating various methods for incorporating the security level ID 128 into the element 124 corresponding to the resource 118. In the example page 502(1), the security level ID 128 is incorporated as an HTML attribute in the HTML tag that is the element 124. The attribute name "seclevel" indicates that this attribute provides the security level ID 128, and the attribute value "13" designates the particular security level that is suggested for communicating the resource 118. Any attribute name and any type of attribute value may be employed in implementations that incorporate the security level ID 128 as an HTML attribute.

In the example page 502(2), the security level ID 128 is incorporated as a communication protocol that prepends the URI that identifies the resource 118 in the element 124. For example, the protocol "HTTPI" in this example may indicate that the security level is to employ integrity security measures such as a MAC, and not confidentiality security measures such as a stronger cryptographic cipher.

In the example page 502(3), the security level ID 128 is incorporated as a URI parameter, such as a query parameter, in the URI that identifies the resource 118 in the element 124. In this example, the parameter name "seclevel" indicates that this parameter provides the security level ID 128, and the parameter value "7" designates the particular security level.

Moreover, in some implementations the determination of the security level may be based on the hostname of the server device 104 that serves the resource 118, as indicated by the URI of the resource 118. In the example of page 502(4), the domain name or hostname of the server device 104 may itself indicate the suggested security level. For example, if the resource 118 is served hostname "xyz123" it may be determined that the security level is to employ a HMAC for integrity but not to employ a stronger cryptographic cipher. If the resource 118 is served by hostname "abc789" it may be determined that the security level is to employ a version of AES encryption. Such a relationship between one or more hostnames and one or more security levels may be described in the security level information 402.

In some cases, various implementations of the security level ID 128 in the element(s) 124 of the page 122 may not be interpretable by a client application 106 (e.g., a web browser) having a standard configuration. In such cases, a plugin or other component may be provided to the client device(s) 102 and installed within the client application(s) 106. Such a plugin may be the security level processing module 108, and may enable the client application 106 to interpret the security level ID 128 through an HTML tag attribute, a communication protocol, a URI query parameter, or through some other specification of the security level ID 128 for the resource 118. In cases where such a plugin has not been installed on the client device 102, the client application 106 may ignore or otherwise not process the security level ID 128, and may employ default levels of security for receiving the page 122 and the resources 118.

Figure 6:
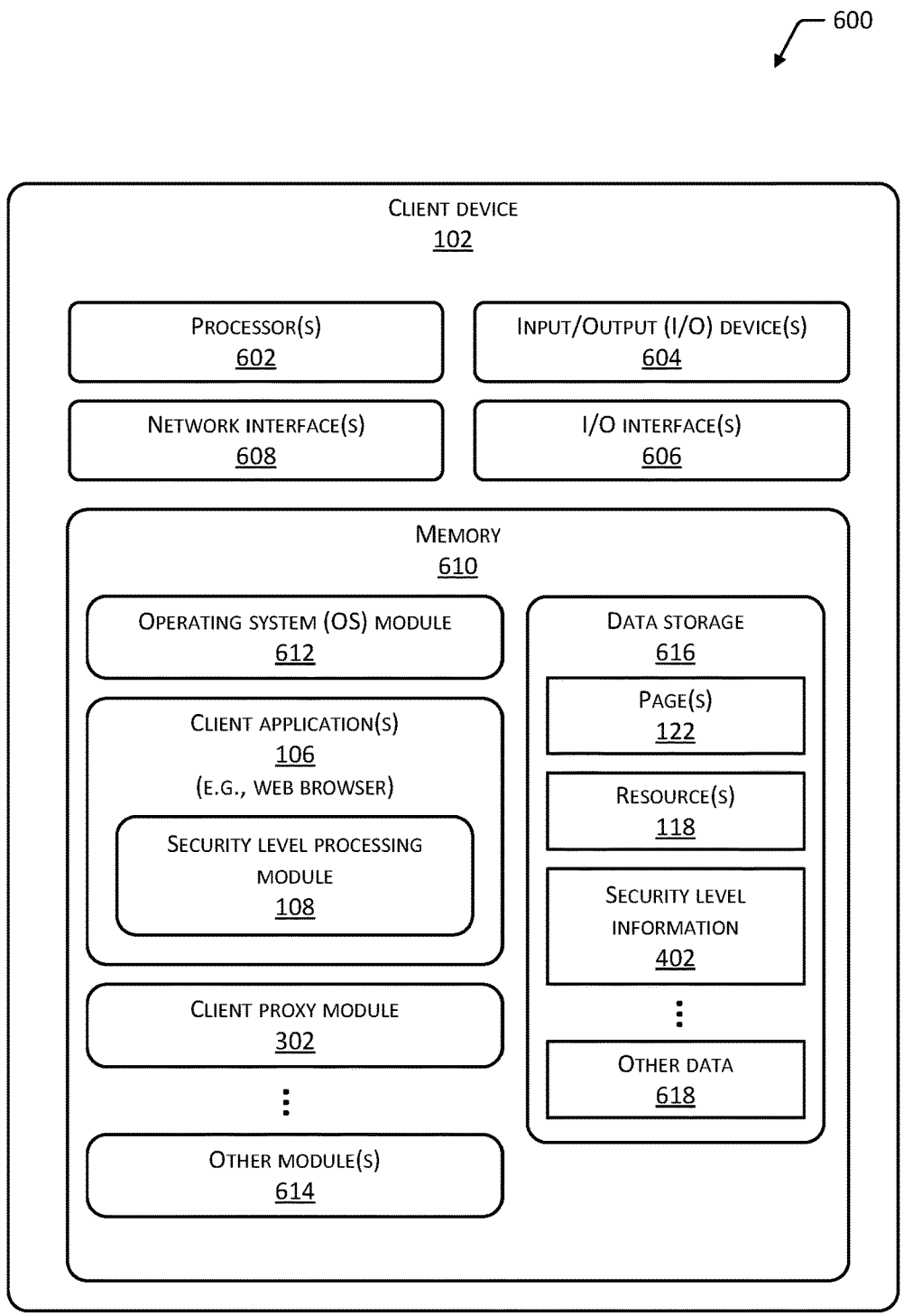
FIG. 6 depicts a block diagram of an example client device on which a page may be presented.

FIG. 6 depicts a block diagram 600 of an example of the client device(s) 102. As shown in the block diagram 600, the client device 102 may include one or more processors 602 configured to execute one or more stored instructions. The processor(s) 602 may comprise one or more cores.

The client device 102 may include one or more input/output (I/O) devices 604. The I/O device(s) 604 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 604 may also include output devices such as a display, an audio output device (e.g., a speaker), a printer, a haptic output device, and so forth. The I/O device(s) 604 may be physically incorporated with the client device 102, or may be externally placed.

The client device 102 may include one or more I/O interfaces 606 to enable components or modules of the client device 102 to control, interface with, or otherwise communicate with the I/O device(s) 604. The I/O interface(s) 606 may enable information to be transferred in or out of the client device 102, or between components of the client device 102, through serial communication, parallel communication, or other types of communication. For example, the I/O interface(s) 606 may comply with a version of the RS-232 standard for serial ports, or with a version of the Institute of Electrical and Electronics Engineers (IEEE) 1284 standard for parallel ports. As another example, the I/O interface(s) 606 may be configured to provide a connection over Universal Serial Bus (USB) or Ethernet. In some cases, the I/O interface(s) 606 may be configured to provide a serial connection that is compliant with a version of the IEEE 1394 standard. The client device 102 may also include one or more busses or other internal communications hardware or software that allow for the transfer of data between the various modules and components of the client device 102.

The client device 102 may include one or more network interfaces 608 that enable communications between the client device 102 and other network accessible computing devices, such as the server device(s) 104 or the content storage device(s) 116. The network interface(s) 608 may include one or more network interface controllers (NICs) or other types of transceiver devices configured to send and receive communications over a network.

The client device 102 may include one or more memories, described herein as memory 610. The memory 610 comprises one or more computer-readable storage media (CRSM). The CRSM may include one or more of an electronic storage medium, a magnetic storage medium, an optical storage medium, a quantum storage medium, a mechanical computer storage medium, and so forth. The memory 610 provides storage of computer-readable instructions that may describe data structures, program modules, processes, applications, or other data for the operation of the client device 102. In some implementations, the memory 610 may provide storage of computer-readable instructions or other information in a non-transitory format.

The memory 610 may include an operating system (OS) module 612. The OS module 612 may be configured to manage hardware resources such as the I/O device(s) 604, the I/O interface(s) 606, and the network interface(s) 608, and to provide various services to applications, processes, or modules executing on the processor(s) 602. The OS module 612 may include one or more of the following: any version of the Linux operating system; any version of iOS from Apple Corp. of Cupertino, Calif., USA; any version of Windows or Windows Mobile from Microsoft Corp. of Redmond, Wash., USA; any version of Android from Google Corp. of Mountain View, Calif., USA and its derivatives from various sources; any version of Palm OS from Palm Computing, Inc. of Sunnyvale, Calif., USA and its derivatives from various sources; any version of BlackBerry OS from Research In Motion Ltd. of Waterloo, Ontario, Canada; any version of VxWorks from Wind River Systems of Alameda, Calif., USA; or other operating systems.

The memory 610 may include one or more of the modules described above as executing on the client device 102, such as the client application(s) 106, the security level processing module 108, and the client proxy module 302. The memory 610 may also include one or more other modules 614, such as a user authentication module or an access control module to secure access to the client device 102, and so forth.

The memory 610 may include data storage 616 to store data for operations of the client device 102. The data storage 616 may comprise a database, array, structured list, tree, or other data structure, and may be a relational or a non-relational datastore. The data storage 616 may store data such as that described above, including one or more of the page(s) 122, the resource(s) 118, or the security level information 402. The data storage 616 may also store other data 618, such as user authentication information or access control data. In some implementations, at least a portion of the information stored in the data storage 616 may be stored externally to the client device 102, on other devices that may communicate with the client device 102 via the I/O interface(s) 606 or via the network interface(s) 608.

Figure 7:
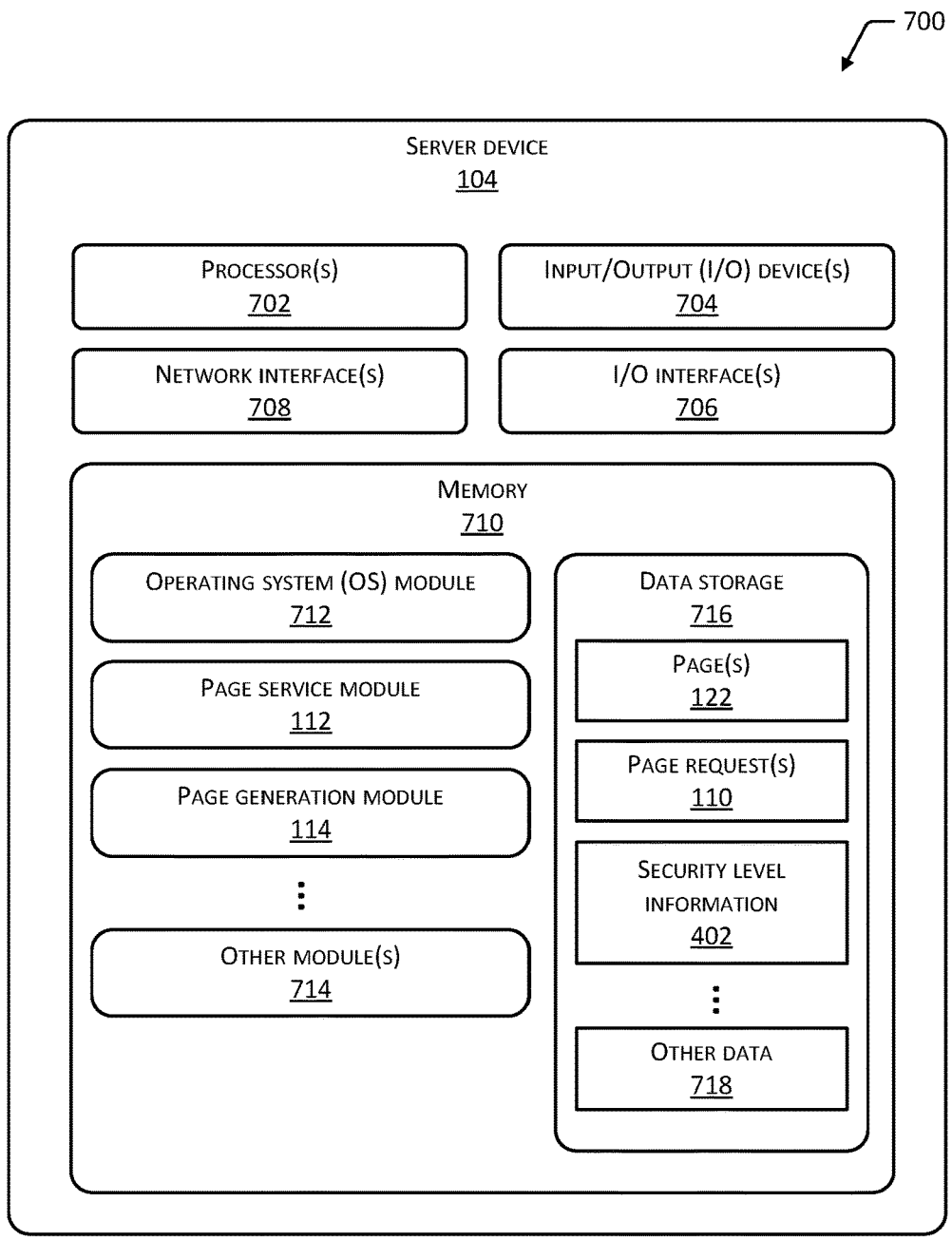
FIG. 7 depicts a block diagram of an example server device configured to serve a page including at least two resources communicated at different security levels.

FIG. 7 depicts a block diagram 700 of an example of the server device(s) 104. As shown in the block diagram 700, the server device 104 may include one or more processors 702 configured to execute one or more stored instructions. The processor(s) 702 may comprise one or more cores. The server device 104 may include one or more I/O devices 704, one or more I/O interfaces 706, and one or more network interfaces 708 as described above respectively with reference to the I/O device(s) 604, the I/O interface(s) 606, and the network interface(s) 608.

The server device 104 may include one or more memories, described herein as memory 710. The memory 710 comprises one or more CRSM, as described above with reference to the memory 610. The memory 710 may include an OS module 712 that is configured to manage hardware resources such as the I/O device(s) 704, the I/O interface(s) 706, and the network interface(s) 708, and to provide various services to applications, processes, or modules executing on the processor(s) 702. The OS module 712 may include one or more of the operating systems described above with reference to the OS module 612. The memory 710 may include one or more of the modules described above as executing on the server device 104, such as the page service module 112 and the page generation module 114. The memory 710 may also include one or more other modules 714, such as a user authentication module or an access control module to secure access to the server device 104, and so forth.

The memory 710 may include data storage 716 to store data for operations of the server device 104. The data storage 716 may comprise a database, array, structured list, tree, or other data structure, and may be a relational or a non-relational datastore. The data storage 716 may store data such as that described above, including one or more of the page(s) 122, the page request(s) 110, or the security level information 402. The data storage 716 may also store other data 718, such as user authentication information or access control data. In some implementations, at least a portion of the information stored in the data storage 716 may be stored externally to the server device 104, on other devices that may communicate with the server device 104 via the I/O interface(s) 706 or via the network interface(s) 708.

FIG. 8 depicts a flow diagram 800 of a process for generating the source code of the page 122 to include one or more elements 124, each element 124 including a resource ID 126 and a security level ID 128 corresponding to a security level for communicating the resource 118. One or more operations of the process may be performed by the client application(s) 106, the security level processing module 108, the client proxy module 302, other modules executing on the client device(s) 102, the page service module 112, the page generation module 114, other modules executing on the server device(s) 104, or other modules executing on other devices.

At 802, the page request 110 is sent from the client device 102 to the server device 104. As described above, in cases where the page request 110 is for a web page, the page request 110 may have been generated by a user of the client device 102 entering a URI into the navigation bar of a client application 106 (e.g., a web browser). In such cases, the page request 110 may be an HTTP request that includes the URI of the requested page 122.

At 804, the page request 110 is received at the server device 104. Based on the page request 110, or based on other information, the requested page 122 may be determined. The one or more resources 118 to be presented in the page 122 may also be determined. In some cases, this determination is based on traversing or otherwise analyzing the DOM for the requested page 122.

At 806, the resource security level metadata 120 is accessed. As described above with reference to FIG. 4, the resource security level metadata 120 may describe a security level to be used in communicating one or more resources 118.

At 808, based at least partly on the resource security level metadata 120, a security level may be determined for one of the resources 118 included in the page 122. As described above, the security level may correspond to a set of security measures 404 to be employed in communicating the resource 118 to the client device 102.

In some implementations, at 810 the security level determined at 808 may be modified based on one or more other criteria. For example, the security level may be modified based on characteristics of the client device 102 or the client application 106, such as whether the client device 102 is suspected to be untrustworthy based on its prior behavior, based on its geographical location, or based on the network path or network routing used to connect. In such cases, the security level may be set to provide higher security than may otherwise be employed. The security level may be modified based on whether there is an above threshold likelihood that the client application 106 is a bot, spider, or other automated process not being used for content requests by a user. In some cases, a different security level may be employed for client device(s) 102 that are mobile devices or that may otherwise have limited processing, storage, or networking capacity. In such cases, a lower security level may be employed than may otherwise be used, to avoid taxing the limited capabilities of the client device 102. In some cases, the security level may be modified based on characteristics of the user operating the client device 102, such as whether the user is deemed to be trustworthy or untrustworthy based on previous behaviors. The security level may also be modified based on network traffic at the server device(s) 104. For example, if a higher than average level of network traffic is detected at the server device 104, or if it is inferred that a denial-of-service or other attack may be in progress, the security level may be set to a higher security level to throttle the traffic.

At 812, the page 122 is generated or modified to include an element 124 that specifies the resource ID 126 (e.g., the URI) of the resource 118 and the security level ID 128 identifying the security level for the resource 118. At 814, a determination is made whether there is at least one more resource 118 included in the page 122. If so, the process may return to 808 and determine the security level for another resource 118. If not, the process may proceed to 816. At 816, the page 122 is communicated to the client device 102. At 818, the page 122 is received at the client device 102 by the client application 106. The process may then continue, as described with reference to FIG. 9.

Figure 9:
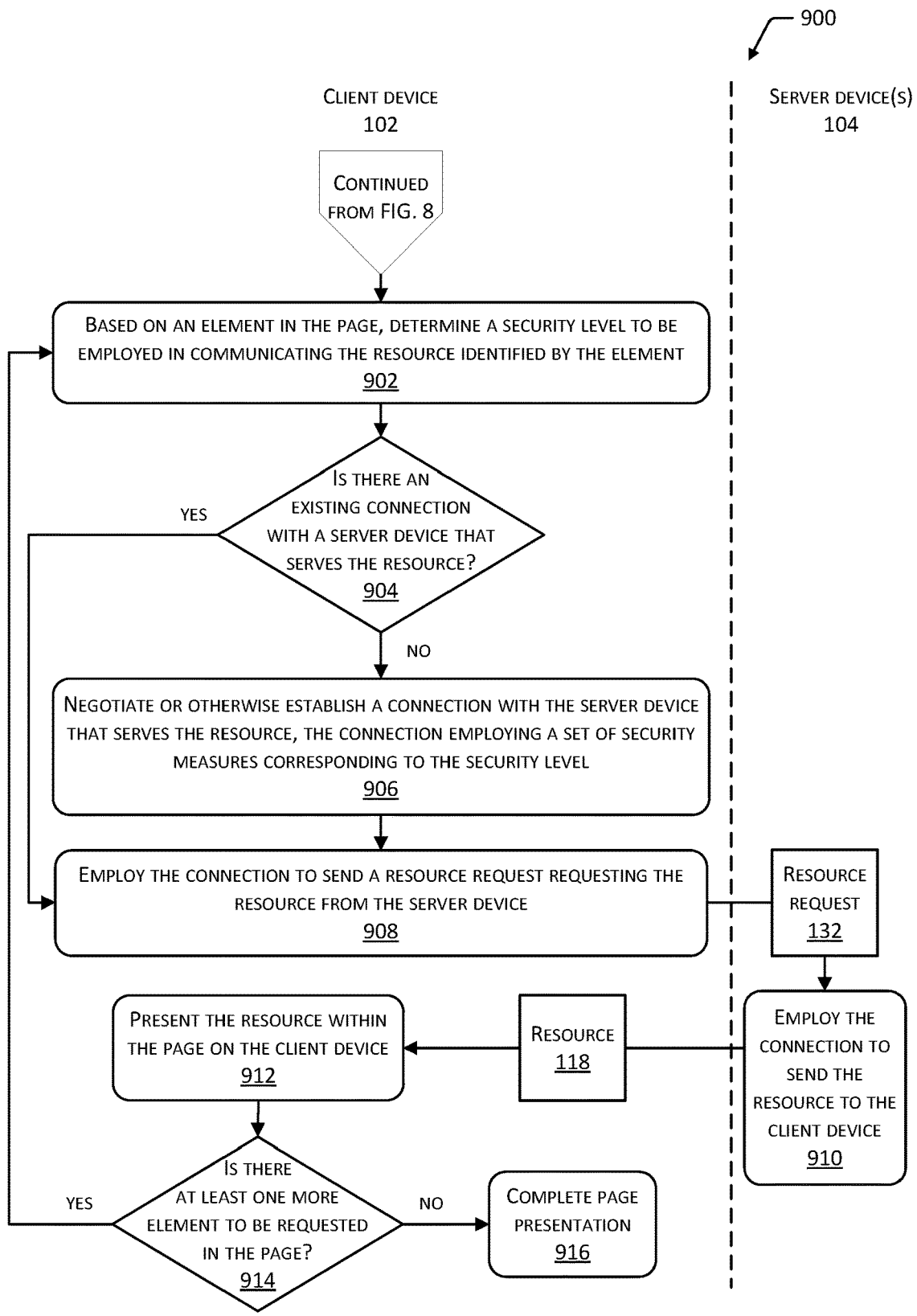
FIG. 9 continues the flow diagram of FIG. 8 and depicts a process for processing a received page and requesting one or more resources specified in the page, each resource being communicated over a connection established according to the security level corresponding to the resource.

FIG. 9 depicts a flow diagram 900 of a process for analyzing the received page 122 and requesting the one or more resources 118 specified in the element(s) 124 of the page 122. One or more operations of the process may be performed by the client application(s) 106, the security level processing module 108, the client proxy module 302, other modules executing on the client device(s) 102, the page service module 112, the page generation module 114, other modules executing on the server device(s) 104, or other modules executing on other devices.

At 902, the source code of the page 122 received at 816 may be analyzed and an element 124 may be identified in the page 122. Based on the security level ID 128 in the element 124, a security level may be determined for communicating the resource 118 identified by the resource ID 126 in the element 124.

At 904, a determination is made whether there is an existing connection 130 to the server device 104 identified as a location of the resource 118 by the resource ID 126 of the element 124. If so, and if the connection 130 was previously established to employ the one or more security measures 406 corresponding to the security level, the process may proceed to 908. The process may then employ the previously established connection 130 to communicate the resource 118. If it is determined at 904 that a connection 130 has not been established to communicate the resource 118, the process may proceed to 906.

At 906, a connection 130 is negotiated or otherwise established between the client device 102 and the server device 104 that serves the resource 118 identified in the element 124. The connection 130 may employ a set of security measures 404 corresponding to the security level designated by the security level ID 128 in the element 124. In cases where the connection 130 is an SSL or TSL connection, the negotiation of the connection 130 may include one or more handshake messages. Such implementations are described further with reference to FIG. 11.

At 908, the connection 130 is employed to send the resource request 132 from the client device 102 to the server device 104 that serves the resource 118. The resource request 132 may include the resource ID 126 such as a URI of the resource 118, and may request that the resource 118 be sent to the client device 102. At 910, the resource request 132 is received at the server device 104 and processed to determine the requested resource 118. The connection 130 may then be employed to send the resource 118 to the client device 102.

At 912, the resource 118 is presented within the page 122 in the client application 106 on the client device 102. At 914, a determination is made whether there is at least one more element 124 to be processed in the page 122, and therefore at least one more resource 118 to be requested. If so, the process returns to 902 to determine another security level corresponding to another resource 118. If not, the process may proceed to 916. At 916, the presentation of the page 122 may be completed. In some cases, the resource(s) 118 may be communicated in parallel, such that the communication of at least two of the resources 118 are communicated over different connections 130 during at least partly overlapping time periods.

Figure 10:
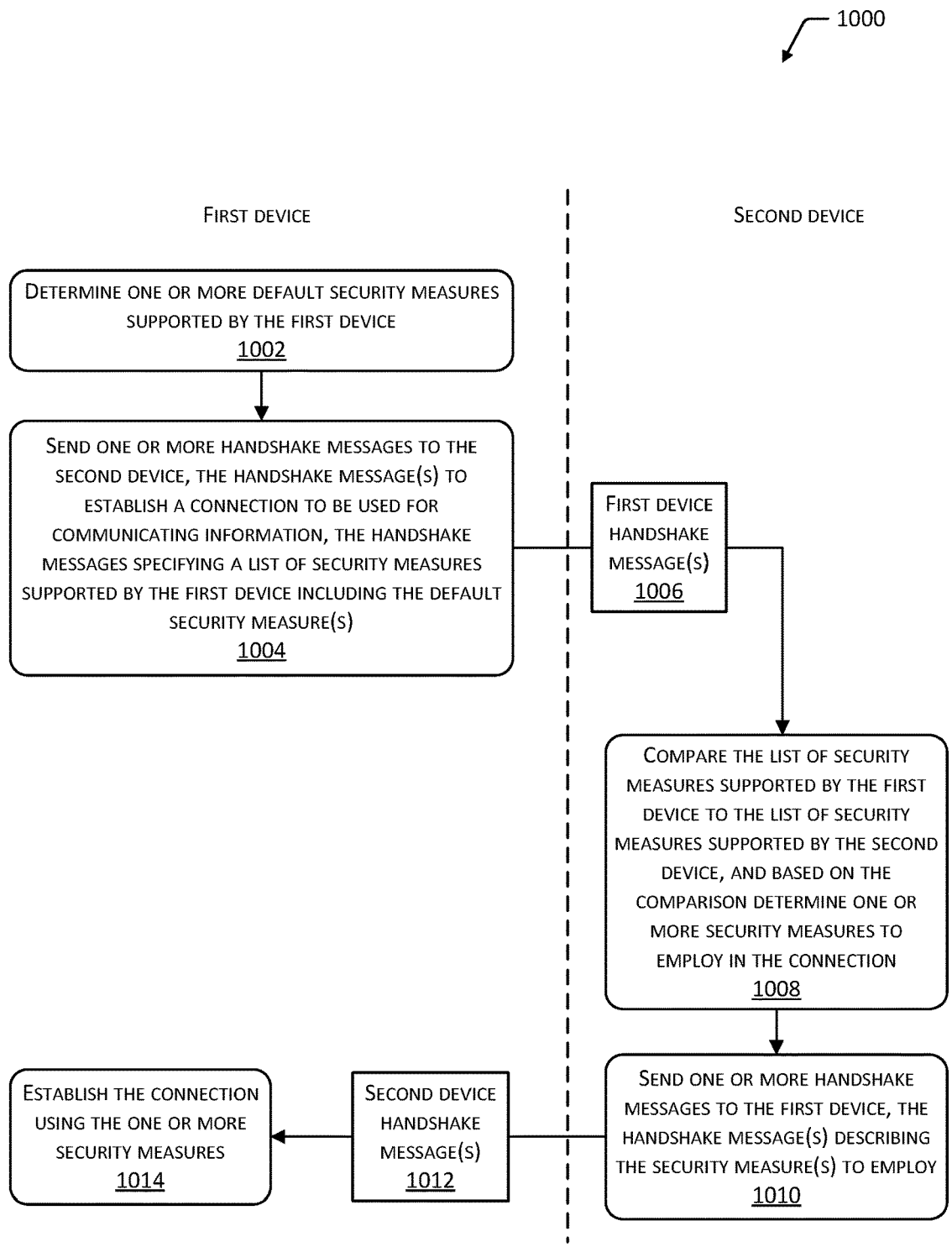
FIG. 10 depicts a flow diagram of a process for establishing a connection between a first device and a second device, the connection to be employed to communicate information between the devices.

FIG. 10 depicts a flow diagram 1000 of a process for establishing a connection between a first device and a second device, the connection to be employed to communicate information between the two computing devices. FIG. 10 is labeled as prior art, given that the process shown in FIG. 10 depicts a negotiation that may be employed in existing computing environments or devices to establish a network connection for communicating information. Such a negotiation may be employed to establish a connection according to a secure communication protocol such as SSL or TLS.

At 1002, on the first device one or more default security measures may be determined based on the default security measure(s) supported by the first device.

At 1004, to begin the negotiation to establish a connection between the two devices, one or more first device handshake messages 1006 may be sent to a second device that serves information (e.g., content) to be presented on the first device. The first device handshake message(s) 1006 may specify a list of security measures supported by the first device. In scenarios illustrated by FIG. 10, the first device handshake message(s) 1006 may specify those default security measures supported by the first device.

At 1008, on the second device, the list of security measures included in the first device handshake message(s) 1006 may be compared to a list of security measures supported by the second device. Based on this comparison, one or more security measures may be identified to be employed in the connection between the first and second devices. The comparison may determine which security measures are supported by both the first and second devices, and may select those security measures that are commonly supported by both devices and ranked highest in a preference order in the list of security measures supported by the first and second devices.

At 1010, one or more second device handshake messages 1012 may be sent to the first device, the second device handshake message(s) 1012 specifying the security measure(s) determined at 1008. At 1014, the connection between the two devices may be established using the security measure(s) specified in the second device handshake message(s) 1012. The establishment of the connection may include the exchange of further handshake messages to exchange cryptographic keys, certificates, and other information to ensure that the connection is secure according to the security measure(s) described in the second device handshake message(s) 1012.

Figure 11:
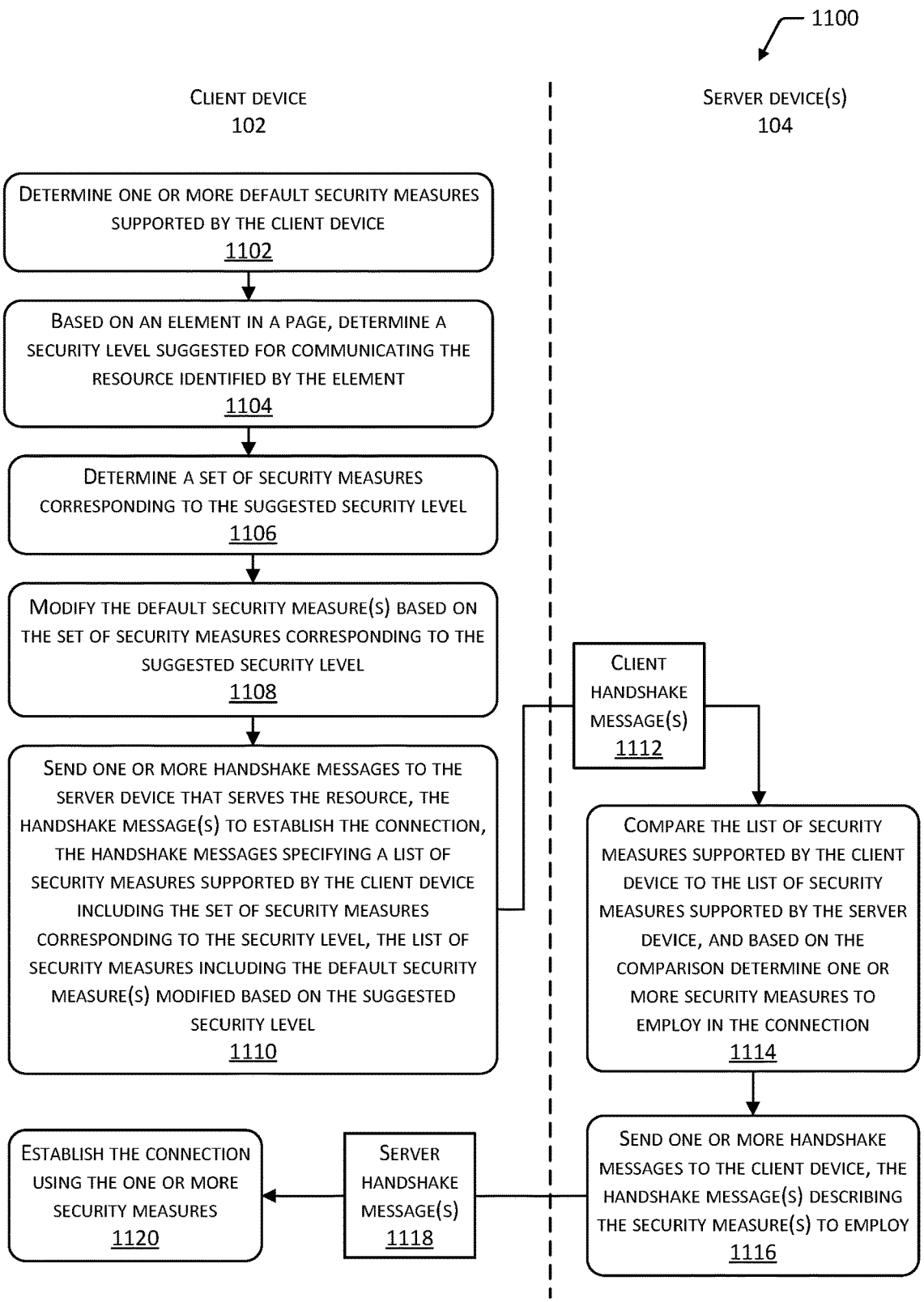
FIG. 11 depicts a flow diagram of a process for establishing a connection between a client device and a server device, the connection to be employed to communicate a resource at a security level suggested for the resource in the page.

FIG. 11 depicts a flow diagram 1100 of a process for establishing the connection 130 between the client device 102 and the server device 104, or between different server devices 104. The connection 130 may be employed to communicate a resource 118 at the security level suggested for the resource 118 in one of the elements 124 of the page 122. One or more operations of the process may be performed by the client application(s) 106, the security level processing module 108, the client proxy module 302, other modules executing on the client device(s) 102, the page service module 112, the page generation module 114, other modules executing on the server device(s) 104, or other modules executing on other devices. FIG. 11 depicts various differences between the traditional connection negotiation methods as illustrated in FIG. 10, and the connection negotiation employed by the implementations described herein.

At 1102, one or more default security measures may be determined based on the default security measure(s) supported by the client device 102. In some cases, the one or more default security measures may be determined based on a type of the client application(s) 106 executing on the client device(s) 102, or on a type of the process that is requesting the connection 130. For example, a different set of default security measures may be determined based on whether the process requesting the connection 130 is the client application(s) 106 (e.g., a web browser), the client proxy module 302, or the page service module 112(2) executing on the server device(s) 104(2). In some cases, the default security measure(s) may be employed to communicate the content of the page 122 generally, and may be indicated in the source of the page 122 or indicated by the protocol prepended to the URI of the page (e.g., https indicating a security SSL or TLS connection to be used).

At 1104, based on a security level ID 128 included in an element 124 in the page 122, a security level may be determined. By incorporating the security level ID 128 into the element 124, the page generation module 114 may suggest the security level to be employed in communicating the resource 118 identified by the element 124. At 1106, a set of security measures 404 may be determined corresponding to the suggested security level corresponding to the security level ID 128 included in the element 124.

At 1108, the default security measure(s) determined at 1102 may be modified based on the set of security measures 404 corresponding to the suggested security level. In some cases, the default security measure(s) may be modified by adding one or more security measures to, or removing one or more security measures from, the list of default security measure(s). The default security measure(s) may also be modified by altering a preference order of the default security measure(s), the preference order indicating a preference of the client device 102 regarding which security measures to employ in the connection 130. The modification of the default security measure(s) may include lowering or raising the security level that the client device 102 may otherwise employ to establish the connection 130. Such a modification may be dynamic, performed in response to a determination of the suggested security level indicated by the security level ID(s) 128 included in the page 122.

At 1110, to begin the negotiation to establish the connection 130, one or more client handshake messages 1112 may be sent to the server device 104 that serves the resource 118. The client handshake message(s) 1112 may specify the list of security measures supported by the client device 102, modified as described with reference to 1108. Accordingly, the list of security measures in the client handshake message(s) 1112 may include the one or more security measures 406 corresponding to the suggested security level for communicating the resource 118. Alternatively, the list of security measures may include all the security measures supported by the client device 102, but in a preference order that designates a preference for the security measure(s) 406 corresponding to the suggested security level. In this way, the client device 102 may indicate to the server device 104 and the security measure(s) 406 that are suggested for communicating the resource 118, as indicated by the security level ID 128 included in the source code of the page 122.

At 1114, on the server device 104, the list of security measures included in the client handshake message(s) 1112 may be compared to a list of security measures supported by the server device 104. Based on this comparison, one or more security measures may be identified to be employed in the connection 130. The comparison may determine which security measures are supported by both the client device 102 and the server device 104, and may select those security measures that are commonly supported by both devices and ranked highest in preference order in the list of security measures supported by the client device 102 and the server device 104, the preference order indicated in the client handshake message(s) 1112.

At 1116, one or more server handshake messages 1118 may be sent to the client device 102, the server handshake message(s) 1118 specifying the security measure(s) determined at 1114. At 1120, the connection 130 may be established using the security measure(s) specified in the server handshake message(s) 1118. The establishment of the connection 130 may include the exchange of further handshake messages to exchange cryptographic keys, certificates, and other information to ensure that the connection 130 is secure according to the security measure(s) 406.

Although FIGS. 8, 9, and 11 depict interactions or communications between the client device(s) 102 and the server device(s) 104, implementations are not so limited. In some cases, as in implementations illustrated by FIG. 2, the interactions or communications depicted may be between different server devices 104. Alternatively, the interactions or communications depicted may be between different client devices 102.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium may be one or more of an electronic storage medium, a magnetic storage medium, an optical storage medium, a quantum storage medium, and so forth. For example, the computer readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine readable signal (in compressed or uncompressed form). Examples of machine readable signals, whether modulated using a carrier or unmodulated, include but are not limited to signals that a computer system or machine hosting or running a computer program can be configured to access, including signals transferred by one or more networks. For example, the transitory machine readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
   receiving, at a server, a request for a web page to be sent to a computing device, the web page including a plurality of resources, wherein the plurality of resources comprise a resource including confidential data;
   accessing security level metadata that describes a security level for the resource identified by a resource identification (ID) in the web page;
   based at least partly on the security level metadata, determining the security level corresponds to one or more security measures of a first set of one or more security measures identified by a security level ID and associated with a security ID to be employed to communicate the resource to the computing device;
   identifying criteria indicative of the computing device being untrustworthy;
   based on the criteria, modifying the first set of the one or more security measures identified by the security level ID corresponding to the security level for the resource identified by the resource ID;
   based on the criteria, modifying a second set of one or more security measures associated with the plurality of resources;
   generating the web page to include an element that identifies the resource using the resource ID and that indicates a connection be negotiated by the computing device using a security measure selected from the first set of the one or more security measures corresponding to the security level identified by the security level ID to communicate the resource from the server to the computing device;
   communicating the web page including the element from the server to the computing device;
   in response to communicating the web page using the server, negotiating with the computing device the connection that uses the security measure selected from the first set of the one or more security measures corresponding to the security level associated with the resource; and
   receiving, by the server, a request for the resource to be sent using the connection employing the security measure.

2. The method of claim 1, wherein:
   the negotiating with the computing device is initiated by the server; and
   the first set of the one or more security measures includes a cryptographic cipher to encrypt the resource.

3. The method of claim 1, wherein:
   the first set of the one or more security measures includes one or more of a cryptographic cipher to encrypt the resource or a message authentication code (MAC) to verify integrity of the resource.

4. The method of claim 1, further comprising:
   comparing one or more security measures supported by the computing device to the first set of one or more security measures determined from the security level metadata; and
   based on the comparing of the one or more security measures supported by the computing device to the first set of the one or more security measures determined from the security level metadata, determine the one or more security measures to employ in the connection.

5. A system, comprising:
   a memory configured for storing computer-readable instructions, the memory further including one or more modules for execution;
   a processor, coupled to the memory, the processor configured to execute the instructions and the one or more modules to:
      determine a page to be sent to a computing device, the page including a plurality of resources, wherein a resource of the plurality of resources includes confidential data;
      access metadata to determine a security level corresponding to one or more security measures of a first set of one or more security measures identified by a security level ID and associated with a security ID to be employed to communicate the resource to the computing device;
      identify criteria indicative of the computing device being untrustworthy;
      based on the criteria, modify the first set of the one or more security measures identified by the security level ID corresponding to the security level for the resource identified by a resource ID;

based on the criteria, modify a second set of one or more security measures associated with the plurality of resources;

communicate, to the computing device, the page including an element that identifies the resource using the resource ID and that indicates a connection be negotiated by the computing device using a security measure selected from the first set of the one or more security measures corresponding to the security level identified by the security level ID to communicate the resource from a server to the computing device;

establish, with the computing device, a negotiated connection that uses the security measure; and send, to the computing device, the resource via the negotiated connection.

6. The system of claim 5, wherein the processor implements:

one or more services configured to access security level metadata that indicates the security level corresponding to the resource, wherein the first set of the one or more security measures corresponding to the security level is based at least partly on the security level metadata.

7. The system of claim 5, wherein:

the element includes a Uniform Resource Identifier (URI) of the resource, the URI including a parameter indicating the security level.

8. The system of claim 5, wherein:

the element includes a Hypertext Markup Language (HTML) tag specifying the resource, the HTML tag including an attribute indicating the security level.

9. The system of claim 5, wherein:

establishing of the negotiated connection is initiated by the computing device; and the element includes a Uniform Resource Identifier (URI) of the resource, the URI including a protocol selected from the first set of the one or more security measures corresponding to the security level associated with the resource.

10. The system of claim 5, wherein:

the first set of the one or more security measures includes a cryptographic cipher to encrypt the resource.

11. The system of claim 10, wherein:

the cryptographic cipher is an Advanced Encryption Standard (AES) cipher that employs a cryptographic key size.

12. The system of claim 5, wherein:

the first set of the one or more security measures includes one or more of a cryptographic cipher to encrypt the resource or a message authentication code (MAC) to verify integrity of the resource.

13. The system of claim 5, wherein the processor implements:

a comparison of one or more security measures supported by the computing device to the list of the first set of one or more security measures determined from the metadata, and based on the comparison, determines one or more security measures to employ in the connection.

14. The system of claim 5, wherein the processor implements:

a modification to the security level based on one or more of: characteristics of a user, a client device, network traffic, network routing, or a location of the client device.

15. One or more non-transitory computer-readable media storing instructions which, when executed by at least one processor, instruct the at least one processor to perform actions comprising:

receiving, from a first computing device, a page at a second computing device, the page including a plurality of elements, wherein the plurality of elements includes an element that identifies a resource using a resource ID and that indicates a connection to be negotiated by the second computing device using a security level identified by a security level ID to communicate the resource, the security level corresponding to a first set of one or more security measures corresponding to the security level identified by the security level ID for communicating the resource;

identifying criteria indicative of the second computing device being untrustworthy;

in response to the criteria, modifying the first set of the one or more security measures identified by the security level ID corresponding to the security level for the resource identified by the resource ID;

in response to the criteria, modifying a second set of one or more security measures associated with the plurality of elements;

negotiating with the first computing device the connection that uses a security measure selected from the first set of the one or more security measures corresponding to the security level associated with the resource; and requesting, by the second computing device, that the resource be communicated to the second computing device using the connection employing the security measure corresponding to the security level associated with the resource identified by the resource ID.

16. The one or more non-transitory computer-readable media of claim 15, wherein:

the requesting that the resource be communicated to the second computing device using the connection further comprises sending at least one handshake message to establish a connection with the first computing device, the connection to be employed to communicate the resource to the second computing device.

17. The one or more non-transitory computer-readable media of claim 15, wherein the actions further comprise:

comparing one or more security measures supported by the first computing device to the first set of one or more security measures determined from metadata, and, based on the comparing of the one or more security measures supported by the first computing device to the first set of the one or more security measures determined from the metada, determine one or more security measures to employ in the connection.

18. The one or more non-transitory computer-readable media of claim 15, wherein the actions further comprise:

determining a modification to the security level based on one or more of: characteristics of a user, a client device, network traffic, network routing, or a location of the client device.

19. The one or more non-transitory computer-readable media of claim 15, wherein:

the first set of the one or more security measures includes a cryptographic cipher to encrypt the resource.

20. The one or more non-transitory computer-readable media of claim 15, wherein:

the first set of the one or more security measures includes one or more of a cryptographic cipher to encrypt the resource or a message authentication code (MAC) to verify integrity of the resource.

* * * * *

UNITED STATES PATENT AND TRADEMARK OFFICE
CERTIFICATE OF CORRECTION

PATENT NO. : 10,574,703 B1
APPLICATION NO. : 15/914690
DATED : February 25, 2020
INVENTOR(S) : Alexander Julian Tribble et al.

Page 1 of 1

It is certified that error appears in the above-identified patent and that said Letters Patent is hereby corrected as shown below:

In the Claims

Column 21, Claim 13, Line 58:
Delete "computing device to the list of the first set of one" and insert -- computing device to the first set of one --

Signed and Sealed this
Fifth Day of May, 2020

Andrei Iancu
*Director of the United States Patent and Trademark Office*